3,291,781
REACTION PRODUCT OF A VINYLIDENE CHLO-
RIDE/VINYL CHLORIDE/ALLYL GLYCIDYL
ETHER TERPOLYMER AND ORTHOPHOSPHON-
IC ACID AND COMPOSITIONS CONTAINING
SAME
James A. Robertson, Lewiston, N.Y., assignor to E. I. du
Pont de Nemours and Company, Wilmington, Del., a
corporation of Delaware
No Drawing. Filed June 27, 1963, Ser. No. 290,909
6 Claims. (Cl. 260—80.5)

This invention relates to polymeric phosphates, and more particularly, to phosphated interpolymers containing epoxy groups and to coating compositions comprising these phosphated interpolymers.

The general class of polymers comprising phosphated interpolymers containing epoxy groups (hereinafter referred to as "phosphated polyepoxides") is known in the art. These phosphated polyepoxides are obtained by reacting phosphoric acid with an interpolymer comprising copolymerized epoxy-monomer units, i.e., a monomer having an epoxy group,

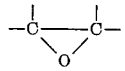

and copolymerized epoxy-free monomer units (such an interpolymer is referred to herein as a "polyepoxide"). Many of these phosphated polyepoxides of the prior art are disclosed in U.S. Patents 2,692,876 and 2,723,971, issued to Cupery. These phosphated polyepoxides are known to be useful as the film-forming ingredient for coating compositions which provide corrosion-resistant coating films for metal substrates.

It is disclosed in the art, particularly in the two aforementioned Cupery patents, that an effective phosphated polyepoxide should be derived from a polyepoxide composed of about 40 to 98% by weight of epoxy-free monomers and 2 to 60% by weight of epoxy monomer. When such a polyepoxide is reacted with orthophosphoric acid ($H_3PO_4$), the acid effects an opening of the epoxy groups to provide a polymer having phosphoric acid ester substituents according to the following scheme:

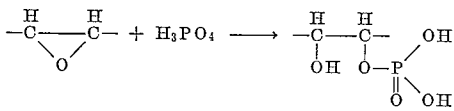

These acidic phosphate groups effect a phosphatizing surface conversion on the metal substrate to which the phosphated polyepoxide is applied. The polyepoxide must be reacted with sufficient orthophosphoric acid to so react with at least half of the available epoxy groups, but the molar amount of orthophosphoric acid must be less than the number of moles of epoxy groups contained in the polyepoxide. The excess or residual epoxy groups render the phosphated polyepoxide curable. Thus, these phosphated polyepoxides are valuable as the film-forming ingredient in coating compositions, since these phosphated polyepoxides provide a relatively moisture-impermeable film containing passivating acidic phosphate groups and which cures to form hard, corresion-resistant coating films. A phosphated polyepoxide heretofore considered by persons skilled in the art to be preferred, is the reaction product of an interpolymer of vinyl chloride and allyl glycidyl ether with orthophosphoric acid, described in Cupery, U.S. Patent 2,723,971.

An object of this invention is to provide an improved phosphated polyepoxide. Another object is to provide an improved coating composition comprising a novel phosphated polyepoxide which forms superior corrosion-resistant coating films for metal substrates. Other objects will be obvious to persons skilled in the art from the following description of this invention.

The objects of this invention are fully attained by the composition comprising the reaction product of a polyepoxide consisting essentially of 60–80% by weight of vinylidene chloride, 12–37% by weight of vinyl chloride and 3–8% by weight of allyl glycidyl ether, with orthophosphoric acid in an amount equal to at least 0.5 and less than 1.0 mole of orthophosphoric acid per mole of allyl glycidyl ether.

In comparing the relative corrosion resistance of coatings of phosphated polyepoxides on a steel substrate, a phosphated copolymer of vinylidene chloride and allyl glycidyl ether is considerably less effective than a phosphated copolymer of vinyl chloride and allyl glycidyl ether (containing comparable proportions of epoxy monomer, epoxy-free monomer, and phosphate groups). A phosphated terpolymer of vinyl chloride, allyl glycidyl ether, and from 25 to 50% by weight of vinylidene chloride is even less effective than the phosphated copolymer of vinylidene chloride and allyl glycidyl ether (containing comparable proportions of epoxy monomer, epoxy-free monomers, and phosphate groups). Therefore, it is very surprising that the phosphated polyepoxide of this invention, derived from a polyepoxide consisting essentially of 60–80% by weight of vinylidene chloride, 12–37% of vinyl chloride, and 3–8% of allyl glycidyl ether, is markedly more effective than the phosphated polyepoxide of vinyl chloride and allyl glycidyl ether (containing comparable proportions of epoxy monomer, epoxy-free monomer, and phosphate groups).

It is essential that the polyepoxide of this invention be composed of 60–80% by weight of vinylidene chloride, 12–37% by weight of vinyl chloride and 3–8% of allyl glycidyl ether. Phosphated polyepoxides derived from polyepoxides of these constituents in proportions outside of these specified amounts, do not possess the remarkable corrosion resistance of the phosphated polyepoxides of this invention. The polyepoxide of this invention may be prepared by any of the well-known techniques for copolymerizing vinyl and epoxy monomers, such as disclosed in U.S. Patent 2,589,237, issued to Ellingboe. It is convenient to prepare this interpolymer by a solution polymerization process. For example, the vinylidene chloride, vinyl chloride, and allyl glycidyl ether monomers are dissolved in an organic solvent such as benzene, methyl ethyl ketone, tetrahydrofuran, toluene and the like, together with a suitable polymerization initiator such as an azo initiator, and heated at about 50–100° C. for sufficient time to obtain the desired conversion and yield. The polyepoxide is then precipitated from the solution and dried. The polyepoxide may also be prepared by an aqueous emulsion polymerization process.

It is essential that the polyepoxide of this invention be reacted with at least 0.5 mole of orthophosphoric acid ($H_3PO_4$) per mole of allyl glycidyl ether unit in the polyepoxide. If less than this amount of orthophosphoric acid is reacted with the polyepoxide there is insufficient acidic phosphate for effective surface conversion of the metal substrate with the result that the phosphated polyepoxide coating film is deficient in corrosion resistance properties. It is also essential that the polyepoxide be reacted with less than 1.0 mole of orthophosphoric acid per mole of allyl glycidyl ether unit. There must be some residual epoxy groups in the phosphated polyepoxide to effect cross-linking between polymer chains, and to thereby provide hard, durable coating films. To insure optimum properties, it is preferred that the polyepoxide be reacted with orthophosphoric acid in an amount equal to 0.6 to 0.9 mole of orthophosphoric acid per mole of allyl glycidyl ether. The most preferred phosphated polyepoxide of this invention is the reaction product of the polyepoxide with orthophosphoric acid in an amount equal to about 0.75 mole of orthophosphoric acid per mole of allyl glycidyl ether.

The reaction between the polyepoxide and the orthophosphoric acid may be accomplished by any suitable process. Preferably, this reaction is carried out in a solution of the polymer in an organic solvent to minimize the possibility of cross-linking the polyepoxide. The solvent should be substantially inert toward epoxide groups and miscible with and substantially inert toward the phosphoric acid. Suitable solvents include the aromatic hydrocarbons, such as benzene, toluene, and the xylenes; aliphatic and aromatic ketones such as acetone, methyl ethyl ketone, cyclobutanone, and acetophenone; acyclic or cyclic ethers such as di-n-butyl ether, dioxane, tetrahydrofuran, and diphenylene oxide; and the like. The polymer solution may be of any concentration within the range of about 1–75% by weight of polymer in the solution, with the preferred range being 20 to 40% by weight.

It is preferred to use the standard sirupy orthophosphoric acid containing about 85% by weight of orthophosphoric acid. The orthophosphoric acid is added to the polymer solution, with stirring, to obtain the desired phosphated polyepoxide. To prevent localized reaction, the orthophosphoric acid should be added to the polymer solution as a mixture of the acid in the same solvent as used in the polymer solution and at a concentration approximately equal to the concentration of the polymer solution. The reaction solution may be used directly to prepare a coating composition.

The phosphated polyepoxide of this invention may be used in solution either clear or pigmented, as a protective coating composition, especially for metal substrates. Any of the pigments commonly used in polymeric coating compositions can be incorporated into the composition of this invention which are inert towards acidic phosphate groups. Suitable pigments include titanium dioxide, carbon black, iron blues, phthalocyanine blues and greens, metal oxides and chromates, organic maroons, and the like. Other ingredients commonly incorporated into polymeric coating compositions may also be used in the composition of this invention such as, inert extenders including talc, mica, and clays; pigment dispersing agents such as potassium tripolyphosphate; antifoam agents; antisettling agents; mildew inhibitors; other film-forming materials which are compatible with the phosphated polyepoxides of this invention and which are mutually soluble in the same solvents, such as urea-formaldehyde resins, melamine-formaldehyde resins, alkyd resins and other natural and synthetic polymers; and the like.

This invention is further illustrated by the following examples. In each of these examples, the phosphated polyepoxides of this invention, and the other phosphated polyepoxides used for comparative purposes, were prepared by the following procedure: Sixty parts by weight of the monomers were dissolved in 40 parts by weight of benzene together with 1%, based on the weight of monomers, of azodiisobutyronitrile, and heated at 75° C. until the polymerization was complete (4 to 8 hours). The polyepoxide was precipitated from the benzene by adding petroleum ether to the solution. The resultant polyepoxide was dried in a vacuum. This polyepoxide was then redissolved in tetrahydrofuran (THF) to form a solution containing 30 parts by weight of polyepoxide and 70 parts by weight of THF. To this THF solution was added with stirring, a second solution of 30 parts by weight of orthophosphoric acid (sirupy phosphoric acid containing about 85% by weight of $H_3PO_4$) and 60 parts by weight of THF. This second solution was added in an amount to provide 0.75 mole of orthophosphoric acid per mole of allyl glycidyl ether unit in the polyepoxide. The resultant solution of phosphate polyepoxide was coated onto 24 gauge, 4 x 12 inches, polished steel panels. The panels were baked at 150° C. for 30 minutes, and then tested as follows: Each panel was scratched to bare metal with a knife to form scribe marks in the shape of an "X" across the entire panel surface. These panels were then subjected to the accelerated salt spray corrosion test described in ASTM standard B117–57T. The salt spray cabinet used in this test was operated at 95° F. with a fog condensation rate of 0.7–2.0 ml. per hour through a 5 inch funnel, using 5% brine. Exposure times, in hours, required to give ¼ inch corrosion layback in both directions from the scribe marks (a total of ½ inch corrosion failure), were determined, and are noted in the examples. In these examples, the following abreviations are used: $VCl_2$, vinylidene chloride; VCl, vinyl chloride; AGE, allyl glycidyl ether.

The phosphated polyepoxides are identified by monomer constituents of the polyepoxide followed by the weight percentage monomer proportions in parentheses. For example, a phosphated polyepoxide of 77% by weight of vinylidene chloride, 17% by weight of vinyl chloride and 6% by weight of allyl glycidyl ether is identified as: $VCl_2/VCl/AGE$ (77/17/6). Inherent viscosities of the polyepoxides were determined in 0.5% solutions of THF at 25° C. and were all within the range of 0.08–0.2. All of the data shown in these examples represent the results of at least two trials.

*Example 1*

This example shows that when relative corrosion resistance of phosphated polyepoxides derived from VCl/AGE polyepoxides, $VCl_2$/AGE polyepoxides, and $VCl_2$/VCl/AGE polyepoxides having component proportions outside the ranges specified in this invention. The results of this example are summarized in Table 1:

TABLE 1

| Test No. | Phosphated Polyepoxide | Film Thickness, mils | Hours to ½" Corrosion Failure |
|---|---|---|---|
| 1 | VCl/AGE (90.4/9.6) | 0.7–0.9 | 432 |
| 2 | $VCl_2$/AGE (90.6/9.4) | 0.5 | 264 |
| 3 | $VCl_2$/VCl/AGE (32/60/8) | 0.4–0.6 | 168 |
| 4 | $VCl_2$/VCl/AGE (39/48/13) | 0.4 0.7 | 168 |
| 5 | $VCl_2$/VCl/AGE (49/39/12) | 0.4–0.6 | 216 |

This example shows that when relative corrosion resistances are compared, the phosphate polyepoxide derived from $VCl_2$/AGE is considerably less effective than a comparable phosphate polyepoxide derived from VCl/AGE (comparing Tests 1 and 2). Moreover, phosphated polyepoxides derived from $VCl_2$/VCl/AGE, containing up to 49% $VCl_2$, are even less effective than the comparable $VCl_2$/AGE derived phosphated polyepoxide.

*Example 2*

This example demonstrates the unexpected results obtained with the phosphated polyepoxides of this invention. The results of this example are summarized in Table 2:

TABLE 2

| Test No. | Phosphated Polyepoxide | Film Thickness, mils | Hours to ½" Corrosion Failure |
|---|---|---|---|
| 6 | $VCl_2$/VCl/AGE (60/37/3) | 0.3–0.8 | 816 |
| 7 | $VCl_2$/VCl/AGE (66/28/6) | 0.5–0.8 | 720 |
| 8 | $VCl_2$/VCl/AGE (76/19/5) | 0.4–0.6 | 624 |
| 9 | $VCl_2$/VCl/AGE (77/17/6) | 0.6–1.2 | 1,000 |

This example shows that a phosphated polyepoxide derived from a polyepoxide consisting essentially of 60–80% by weight of vinylidene chloride, 12–37% of vinyl chloride, and 3–8% of allyl glycidyl ether, is remarkably more effective in corrosion resistance characteristics than is a comparable phosphated polyepoxide derived solely from vinyl chloride and allyl glycidyl ether (comparing Tests 6, 7, 8 and 9 with Test 1 of Example 1). These results are most unexpected and surprising in view of the corrosion properties of phosphated polyepoxides derived from $VCl_2/AGE$ polyepoxides and $VCl_2/VCl/AGE$ polyepoxides having component proportions outside the ranges specified for this invention, as discussed in Example 1.

I claim:

1. A phosphated polyepoxide consisting essentially of a terpolymer of 60 to 80 weight percent vinylidene chloride, 12 to 37 weight percent vinyl chloride and 3 to 8 weight percent allyl glycidyl ether, reacted with at least 0.5 and less than 1.0 mole of orthophosphoric acid per mole of said ether.

2. The produce of claim 1 wherein said terpolymer is reacted with 0.6 to 0.9 mole of said acid per mole of said ether.

3. The product of claim 2 wherein said terpolymer is reacted with about 0.75 mole of said acid per mole of said ether.

4. A coating composition comprising a solution of the product of claim 1 in an organic solvent.

5. A composition according to claim 4 containing a pigment.

6. A coating composition comprising a solution of 20 to 40 weight percent of the product of claim 3 in an organic solvent.

References Cited by the Examiner

UNITED STATES PATENTS 2,723,971  11/1955  Cupery _____ 260—85.7
3,175,926  3/1965  Hahn et al. _____ 260—80.5

JOSEPH L. SCHOFER, *Primary Examiner.*

W. HOOVER, *Assistant Examiner.*